United States Patent [19]
Lea et al.

[11] Patent Number: 5,408,096
[45] Date of Patent: Apr. 18, 1995

[54] INSTRUMENT FOR A CENTRIFUGAL SEPARATOR FOR DETECTING THE PRESENCE OF A BODY AND ROLLING MILL PROVIDED WITH SUCH AN INSTRUMENT

[75] Inventors: Richard W. Lea, Leicestershire, England; Robert De Visser, Heerhugowaard, Netherlands

[73] Assignee: Hoogovens Groep B.V., Ijmuiden, Netherlands

[21] Appl. No.: 146,006

[22] PCT Filed: May 11, 1992

[86] PCT No.: PCT/EP92/01107

§ 371 Date: Nov. 15, 1993

§ 102(e) Date: Nov. 15, 1993

[87] PCT Pub. No.: WO92/20992

PCT Pub. Date: Nov. 26, 1992

[30] Foreign Application Priority Data

May 13, 1991 [NL] Netherlands ............... 9100822

[51] Int. Cl.⁶ .............................................. H01J 5/02
[52] U.S. Cl. .................................... 250/239; 250/238
[58] Field of Search ............... 250/561, 238, 239, 554; 356/28

[56] References Cited

U.S. PATENT DOCUMENTS

| | | | |
|---|---|---|---|
| 3,824,015 | 7/1974 | Petit et al. | 356/28 |
| 4,738,528 | 4/1988 | Craft | 359/509 |
| 4,784,491 | 11/1988 | Penney et al. | 356/376 |
| 5,000,580 | 3/1991 | Leininger et al. | 356/44 |
| 5,180,921 | 1/1993 | Moreau et al. | 250/554 |
| 5,317,165 | 5/1994 | Montagna | 250/554 |

FOREIGN PATENT DOCUMENTS

| | | |
|---|---|---|
| 1432792 | 2/1966 | France . |
| 895161 | 11/1953 | Germany . |
| 1497581 | 4/1969 | Germany . |
| 3312031 | 10/1983 | Germany . |
| 8815494 | 3/1989 | Germany . |
| 1114682 | 5/1968 | United Kingdom . |

*Primary Examiner*—David C. Nelms
*Attorney, Agent, or Firm*—Stevens, Davis, Miller & Mosher

[57] ABSTRACT

An instrument for detecting the presence of a body, comprising a detector (2) and a housing (1) in which the detector (2) is accommodated. The housing (1) is provided with at least one guide passage (6) for transmission to the detector (2) of one or more signals originating from the body. The housing (1) is also provided with means for supplying a gas flow (8), for example, compressed air, and a means for discharging at least a part of said flow through the guide passage (6) in such a way that, during operation at least a part of the cleaning gas leaves the housing (1) via the transmission passage (6). At the same time the invention relates to a rolling mill provided with means for determining velocities of the products to be rolled. The means for determining recording velocity comprises at least two of the instruments above and a processing unit which is linked to receive the signals from those instruments for ascertaining the velocity of a product detected by the instruments.

19 Claims, 3 Drawing Sheets

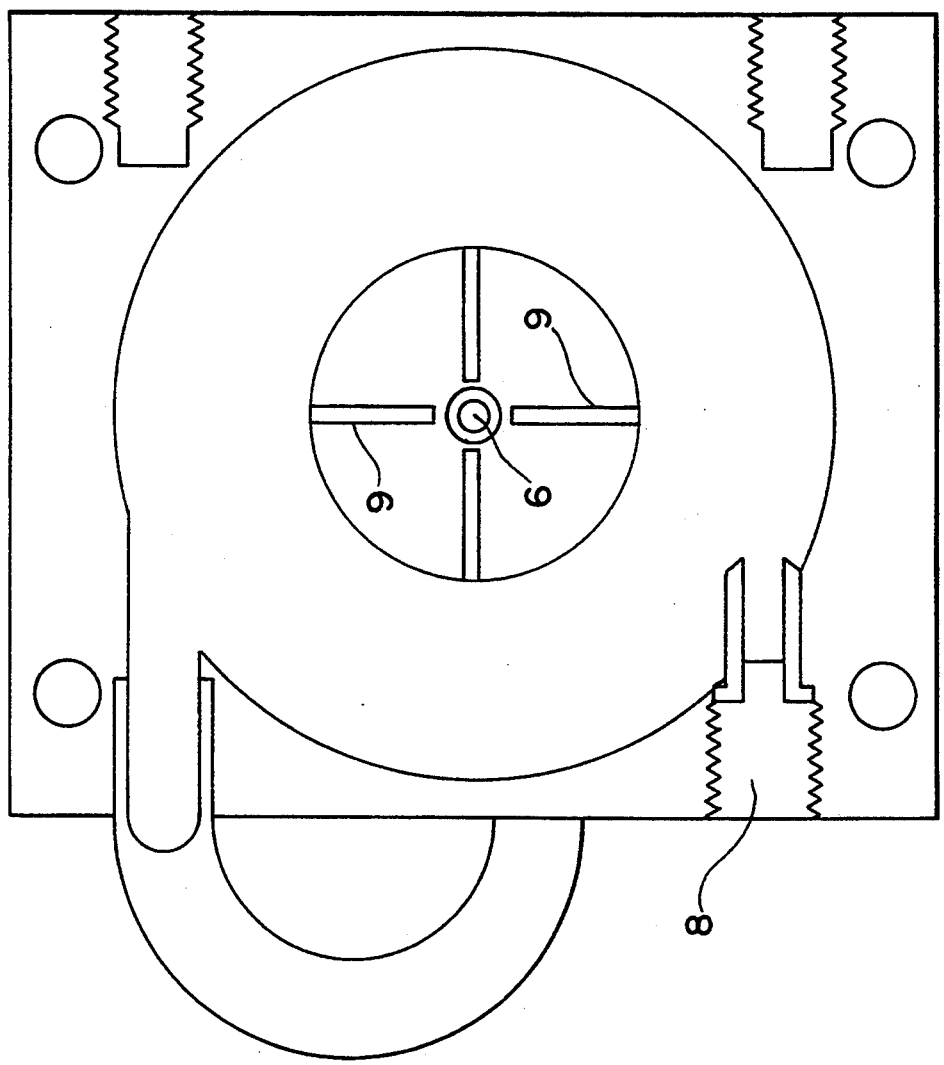

INSTRUMENT FOR A CENTRIFUGAL SEPARATOR FOR DETECTING THE PRESENCE OF A BODY AND ROLLING MILL PROVIDED WITH SUCH AN INSTRUMENT

The invention relates to an instrument for detecting the presence of a body, comprising a detector and a housing in which the detector is accommodated.

One known type of instrument is based on the principle of thermal radiation detection from a body. However, detection methods using other wave ranges are also known. Such a device comprises a housing provided with a least a transmission passage aimed in the direction of the body to be detected suitable for guiding to the detector one or more signals originating from the body. An instrument of this type is used in the practice of continuous casting. Applications in rolling mill installations are also known. Also applications in the field of measuring temperatures in hostile environments are known. Reference is made to U.S. Pat. No.5,000,580 and DE-C-895,161. U.S. Pat. No. 5,000,580 discloses a radiation pyrometer suitable for detecting the presence of a body, which basically comprises a detector (1) in a housing having a guide passage for transmission of radiation from the body to be detected, and is equiped with a gas purge system for directing cleansing gas (air) onto a lens and down the guide. At the distal end of the guide an additonal gas injection system is arranged of which one part defines a conduit about the end of said guide, and another part defines a slot from which gas (air) is discharged into the conduit away from the housing and about the guide passage.

A similar configuration is disclosed in DE-C-895,161. Whereas in U.S. Pat. No. 5,000,580 both puree and injection system are provided with pressurized gas, in DE-C-895,161 injection of gas takes place only via a separate inlet of the additonal injection system resulting in suction of gas through the purge system.

Further prior art (U.S. Pat. No. 4,738,528) shows a method of cleaning a pyrometer lens by directing purge aire spirally inward over the lens surface such that a vortex is formed by the spiral air flow to increase effectivity of the cleaning action.

U.S. Pat. No. 4,784,491 teaches the application of pitched grooves or screw threads in the walls of a gas channel to induce a swirling flow to protect optics against debris and moving particles in the air.

GB-A-1,114,682 proposes the application of a head for a detection instrument, including tangential gas inlet for supply of cleaning gas along the sight-way of the instrument.

In this application the instrument serves to detect the presence of a slab to be rolled out for purposes such as bringing the mill stands of the rolling mill up to the desired angular velocity on time and for making other setting adjustments. Instruments of the kind referred to in the preamble are also used in rolling mills provided with a reversing rolling unit. In a reversing rolling unit a slab is rolled out in a number of backward and forward motions into an intermediate product which is suitable for being rolled out to a desired finished rolling thickness in a finishing train. It is important in the use of such a reversing rolling unit to detect not only when the slab to be rolled is approaching the roller but also when it is leaving the roller. Valuable production time may be saved with this information, given that, for example, detecting the slab leaving the mill stand offers the opportunity of reversing the drive direction of that mill stand as early as possible.

There is a problem in the applications mentioned above in that the instrument has to work in highly contaminated surroundings which adversely affect the operation of the instrument especially in respect of the temperature conditions. Consequently, the known instrument requires a great deal of maintenance. These aggravating conditions include the continual presence of surrounding air saturated with moisture as a result of the cooling water sprayed onto the rollers and the high pressure descaling water for removing the scale from the slab to be rolled. In addition much dirt is present in the surrounding air in the form of iron oxide or oil. Also associated with this is the problem that, in terms of measuring (recording) roller technology, the known instrument for detecting the presence of a body is, in itself, difficult to use in this application, given that the air is saturated with moisture in the form of steam.

The invention is intended to offer a solution to the above-mentioned problems and to achieve further advantages which shall be illustrated in the following.

The invention provides an instrument for detecting the presence of a body, comprising a detector and a housing, in which the detector is accommodated, said housing being provided with at least one guide passage for transmission to the detector of signals originating from the body comprising means for supplying a gas flow and means for directing at least part thereof through said guide passage, and further comprising a device with an inner and an outer element, the inner element providing a central throughflow conduit surrounding said guide passage, and said outer element at least partially arranged about the inner element and cooperating therewith to form a slot for discharge of gas into said conduit away from The housing and around said passage, and is characterised in that the instrument is further provided with a centrifugal separator for separating the cleaning gas into clean and polluted fractions,whereby the means of supplying the cleaning gas are connected close to the outer periphery of the centrifugal separator and at least a part of the means for discharging the said cleaning gas is connected adjacent to the centre of the separator, whereby means for the discharge of the polluted fraction are connected to the said device for discharge of the said polluted fraction through said slot. According to the invention the desired cleaning may be realised using cleaning gas which itself is contaminated. Such gas is present, for example, in the local compressed air supply network of a hot-rolling mill. This supply network makes use of surrounding air present in the rolling mill and consequently it is contaminated, among other things, by oil particles suspended in the air.

With the centrifugal separator proposed the cleaning gas coming from that supply network is split into a pollutant rich fraction and a fraction with a low pollutant level. The lower pollutant fraction obtained with the separator may be used for discharging via the transmission passage.

Preferably, at the beginning of the transmission passage the centrifugal separator should be provided, adjacent its centre, with deflector means positioned transverse To the direction of the movement of the cleaning gas for reducing the rotational flow energy in the cleaning gas. This counteracts the strongly circular motion of the cleaning gas as it leaves The centrifugal separatorvia the transmission passage so that the cleaning gas is conveyed in an essentially straight path along the Transmission passage.

In a preferred embodiment of the instrument in accordance with the invention the transmission passage is provided with a constriction preferably close to its end remote from the detector. Thus the cleaning gas attains its highest exit rate at the outer end of the transmission passage and consequently the entry of dirt into the housing is further impeded.

It has been found that the line of sight for the outflow of the cleaning gas from the transmission passage is capable of having a sighting range of approximately three meters away from the housing. It is believed chat this is brought about because the gas flow which is generated by means of the device and which surrounds the gas flow out of the transmission passage, protects the latter against turbulence (reversal) caused by dirt and steam in the surroundings. It is preferable for the discharge slot to be provided on the end of the device nearer to the housing and to be directed away from the housing cowards the central conduit of the device. Thus the gas leaving the discharge slot via the central conduit of the device creates a local pressurised region of the side of the device closest to the housing. As a result; of this the surrounding air from that side is forced along through the central conduit of the device so that a large air movement occurs which surrounds the centrally situated gas flow from the transmission passage and protects it against turbulence.

In a preferred embodiment the transmission passage extends through the central conduit of the device and terminates in the region of an end of the central conduit further from the housing. This embodiment is found to give especially good result in terms of the distance from which the instrument may still be used to detect a body. The reason for this is that in this embodiment the central line of sight, resulting from the gas outflow from the transmission passage, remains unchanged for a particularly long time by any turbulence of that flow.

An alternative embodiment is characterised in that the device is positioned beyond and adjacent to the outlet mouth of the transmission passage. This embodiment is preferable for use in very contaminated surroundings.

The invention described in the foregoing is as yet described only in terms of application with an instrument which comprises only one detector, though it is not limited to that. The invention is also embodied in an instrument in which the housing is also provided with a signal transmitter and a further transmission passage for directing a signal from the transmitter to the body to excite the signal to be received by the detector. The transmission passage forms at least a part of the discharge means for the cleaning gas flow.

BRIEF DESCRIPTION OF THE DRAWINGS

The invention will now be described, by way of example, with reference to the accompanying drawings.

FIG. 3 shows a cross-section through the centrifugal separator of the instrument in accordance with the invention.

Corresponding reference numerals in the figures indicate corresponding parts of the instrument.

In FIG. 1 and 2 an instrument is shown comprising a housing (1), a detector (2) in the housing (1), which detector (2) is mounted behind a lens (3). Detector (2) is for example an infrared sensitive element which emits an electrical signal if it is activated by infrared radiation, The said electrical signal is led via a cable (4) to further processing equipment.

Figure 1:
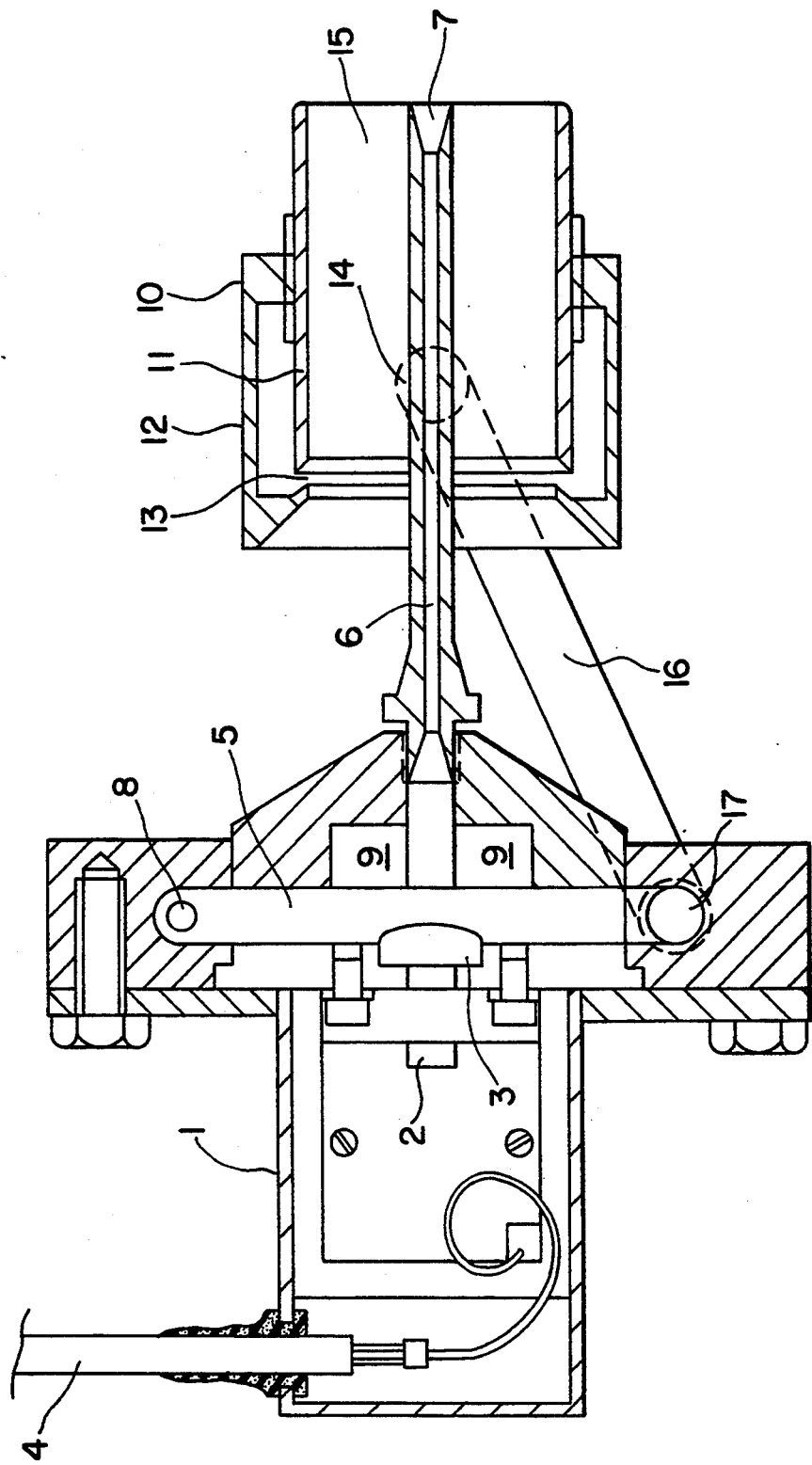
FIG. 1 shows the instrument in accordance with the invention in a first embodiment.

On the side of the lens (3) the housing (1) is provided with a centrifugal separator (5) in which cleaning gas is processed in order firstly for it to help keep clean the surface of the lens (3) and further to help keep clean a transmission guide passage (6) that extends from the lens surface (3) to an end or mouth (7) close to an outer boundary of the housing (1).

Cleaning gas is supplied into the centrifugal separator (5) via a feeder point (8). To this feeder point (8) may be connected, for example, compressed air that may be contaminated. In the centrifugal separator the compressed air supplied via feeder point (8) is brought int a circular motion so that any dirt particles present in the compressed air concentrate on the outer circumference of the centrifugal separator (5) and as a result of this the compressed air moving close to the lens surface (3) is comparatively clean and can clean the lens surface (3) effectively because of the rapid circular motion.

Near the transmission passage (6) the centrifugal separator (5) is provided at its centre with plates (9) (see also FIG. 3) which slow down the circular motion of the cleaning gas supplied via feeder point (8) and cause an essentially straight motion of the cleaning gas into the transmission passage (6). The cleaning gas leaves the housing (1) via transmission passage (6) and its mouth (7). Preferably the mouth (7) of the transmission passage is also provided with a constriction in order to effect a higher outflow rate near to this outer boundary of the instrument.

At the same time the instrument is provided with an device (19) comprising a first element (11) and a second element (12) which, acting jointly, define a discharge slot (13). The device (19) is provided with a feeder point (14) for a gas which can leave the device (10) in a direction away from the housing (1) through the discharge slot (13) and via a central conduit (15) of the device (10). The gas that leaves the transmission passage (6) is then surrounded by the gas that leaves the device discharge slot (13) through the central conduit (15) of the device (10). This creates a laminar flow whereby an extended line of sight is formed from the end of transmission passage (6). The line of sight corresponds with the gas outflow from transmission passage (6) and is maintained by the gas flow which surrounds the gas outflow from transmission passage (6), and which is induced by the gas escaping out of discharge slot (13). The belief is that this is particularly encouraged because the gas that leaves the discharge slot (13) via the central conduit (15) of the device (10) creates a local pressurised region on the side of the device (10) near the housing (1). As a result the surrounding air from that side is forced along through the central conduit (15) of the device (10), so that a large air movement occurs. This surrounds the centrally situated gas flow out of the transmission passage (6) and protects it against turbulence (reversal).

FIG. 1 shows chat the mouth (7) of the transmission guide passage (6) opens out adjacent to the side of the central conduit (15) of the device (10) facing away from the housing (10). This embodiment is found to be particularly effective for extending the sight passage over a long distance from the end of transmission passage (6).

Figure 2:
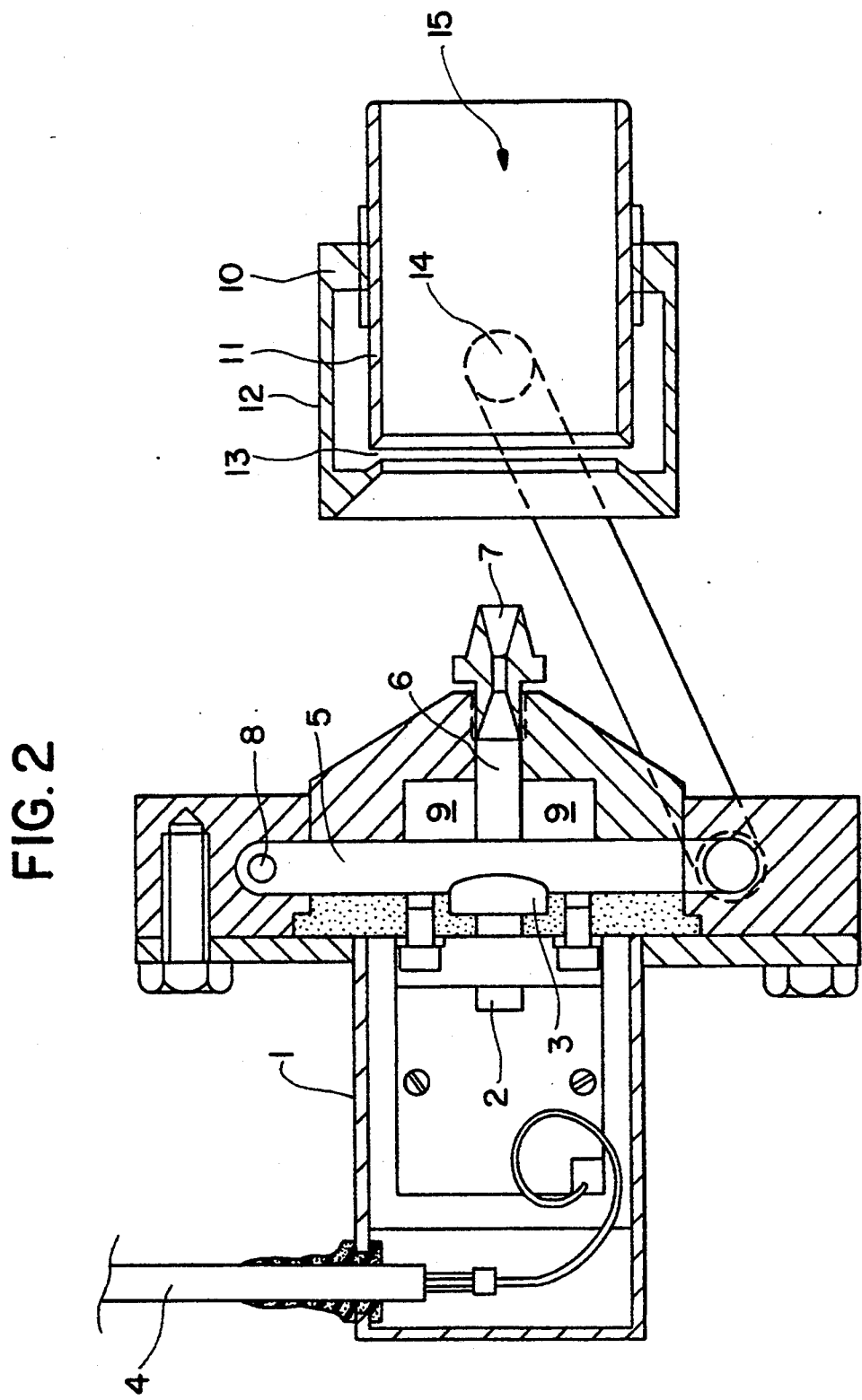
FIG. 2 shows the instrument in accordance with the invention in a second embodiment.

An alternative embodiment is shown in FIG. 2 whereby the mouth (7) of the transmission passage (6) is positioned just in front of the central conduit (15) of the device (10). This embodiment is found to be very effective in highly contaminated surroundings.

The feeder point (14) of the device (10) is connected, by means of a rigid connection pipe (16) to the discharge point (17) for the relatively polluted fraction of the cleaning gas originating from the centrifugal separator (5). This makes it possible to ensure fixed positioning of the device (10) relative to the housing (1).

The invention is not limited to the example embodiments described in the foregoing but may be applied with equal success with instruments, which, instead of a single detector (2), are provided at the same time with a signal transmitter and another transmission passage suitable for guiding a signal originating from the transmitter in the direction of the body to be detected. The transmission passage in doing so forms at least a part of the means of discharge of the cleaning gas. The signal is suitable for causing another signal to be generated from the body, this signal being suitable for being detected by the detector.

We claim:

1. An instrument for detecting the presence of a body, comprising a detector (2) and a housing (1), in which the detector (2) is accommodated, said housing (1) being provided with at least one guide passage (6) for transmission to the detector (2) of signals from the body, and with means for supplying a gas flow (8), and means for directing at least a part of said flow through the guide passage (6) such that, during operation, at least a part of the gas flow leaves the housing (1) via the guide passage (6), and further comprising a device (10) entailing an inner element (11) providing a central throughflow conduit (15) surrounding the guide passage (6) or an extension of the discharge flow path therefrom, and an outer element (12) at least partially arranged about the inner element (11), said elements cooperating in defining a slot (13) for discharge of gas into said conduit in a direction away from the housing (1) and around said passage (6) or said extension, characterised in that it is provided with a centrifugal separator (5) for separating the gas into a clean and a polluted fraction, and wherein gas supplying means (8) are connected close to the outer periphery of the centrifugal separator (5), and the gas directing means comprises a connection adjacent the centre of said separator (5), whereby means for the discharge of the polluted fraction are connected to said device (10) for said discharge of said polluted fraction through said slot (13).

2. The instrument according to claim 1, wherein the centrifugal separator (5) is provided adjacent its centre with deflector means (9) positioned transverse to the direction of flow of the gas for reducing the rotational flow energy of the gas.

3. The instrument according to claim 1, wherein the guide passage (6) extends through the central conduit (15) of the device and terminates in the region of an end of the central conduit further from the housing.

4. The instrument according to claim 1, wherein the device (10) is positioned beyond and adjacent to an outlet mouth (7) of the guide passage (6).

5. The instrument according to claim 1 wherein the gas flow directing means are provided for directing a further part of said housing gas flow for said discharge through said slot (13).

6. The instrument according to claim 1 provided with a centrifugal separator (5) for separating the gas into a clean and a polluted fraction, and wherein the gas supplying means (8) is connected close to the outer periphery of the centrifugal separator (5), and the gas directing means comprises a connection adjacent the centre of said separator (5), wherein means for the discharge of the polluted fraction is connected to said device (10) for said discharge of said fraction through said slot (13).

7. The instrument according to claim 6, wherein the centrifugal separator (5) is provided adjacent its centre with deflector means (9) positioned transverse to the direction of flow of the gas for reducing the rotational flow energy of the gas.

8. The instrument according to claim 1 wherein the housing (1) is provided with a signal transmitter and a further guide passage for directing a signal from the transmitter towards the body to excite said signal to be received by the detector, said further passage forming at least a part of the directing means for the gas flow.

9. The instrument according to claim 4, provided with a centrifugal separator (5) for separating the gas into a clean and a polluted fraction, and wherein the gas supplying means (8) is connected close to the outer periphery of the centrifugal separator (5), and the gas directing means comprises a connection adjacent the center of said separator (5), wherein means for the discharge of the polluted fraction is connected to said device (10) for said discharge of said fraction through said slot (13).

10. The instrument according to claim 2, wherein the guide passage (6) extends through the central conduit (15) of the device and terminates in the region of an end of the central conduit further from the housing.

11. The instrument according to claim 2, wherein the device (10) is positioned beyond and adjacent to an outlet mouth (7) of the guide passage (6).

12. The instrument according to claim 2, wherein the gas flow directing means are provided for directing a further part of said housing gas flow for said discharge through said slot (13).

13. The instrument according to claim 3, wherein the gas flow directing means are provided for directing a further part of said housing gas flow for said discharge through said slot (13).

14. The instrument according to claim 10, wherein the gas flow directing means are provided for directing a further part of said housing gas flow for said discharge through said slot (13).

15. The instrument according to claim 4, wherein the gas flow directing means are provided for directing a further part of said housing gas flow for said discharge through said slot (13).

16. The instrument according to claim 11, wherein the gas flow directing means are provided for directing a further part of said housing gas flow for said discharge through said slot (13).

17. The instrument according to claim 2, provided with a centrifugal separator (5) for separating the gas into a clean and a polluted fraction, and wherein the gas supplying means (8) is connected close to the outer periphery of the centrifugal separator (5), and the gas directing means comprises a connection adjacent the center of said separator (5), wherein means for the discharge of the polluted fraction is connected to said device (10) for said discharge of said fraction through said slot (13).

18. The instrument according to claim 3, provided with a centrifugal separator (5) for separating the gas into a clean and a polluted fraction, and wherein the gas supplying means (8) is connected close to the outer periphery of the centrifugal separator (5), and the gas directing means comprises a connection adjacent the center of said separator (5), wherein means for the discharge of the polluted fraction is connected to said device (10) for said discharge of said fraction through said slot (13).

19. The instrument according to claim 10, provided with a centrifugal separator (5) for separating the gas into a clean and a polluted fraction, and wherein the gas supplying means (8) is connected close to the outer periphery of the centrifugal separator (5), and the gas directing means comprises a connection adjacent the center of said separator (5), wherein means for the discharge of the polluted fraction is connected to said device (10) for said discharge of said fraction through said slot (13).

* * * * *